United States Patent [19]

Reinartz et al.

[11] Patent Number: 4,505,113
[45] Date of Patent: Mar. 19, 1985

[54] PLASTIC COMPENSATING RESERVOIR FOR HYDRAULIC BRAKE SYSTEMS

[75] Inventors: Hans-Dieter Reinartz, Frankfurt; Waldemar Vatter, Laubach, both of Fed. Rep. of Germany

[73] Assignee: ITT Industries, Inc., New York, N.Y.

[21] Appl. No.: 527,018

[22] Filed: Aug. 29, 1983

[30] Foreign Application Priority Data

Oct. 25, 1982 [DE] Fed. Rep. of Germany ....... 3239438

[51] Int. Cl.³ .............................................. B60T 17/22
[52] U.S. Cl. ...................................... 60/535; 60/585; 60/562; 60/592
[58] Field of Search ................ 60/534, 535, 562, 584, 60/585, 592; 264/221, 259, 271.1, 328, DIG. 44

[56] References Cited

U.S. PATENT DOCUMENTS 4,168,613 9/1979 Nakagawa et al. ................... 60/535
4,355,512 10/1982 Kubota et al. ......................... 60/534

FOREIGN PATENT DOCUMENTS 3042693 6/1981 Fed. Rep. of Germany .
1558991 3/1969 France .
56-80443 1/1981 Japan ................................... 264/221
1548669 7/1979 United Kingdom .
2074266 10/1981 United Kingdom ................... 60/592

Primary Examiner—Robert E. Garrett
Assistant Examiner—Scott L. Moritz
Attorney, Agent, or Firm—James B. Raden; Edward J. Brosius

[57] ABSTRACT

A plastic compensating reservoir for hydraulic brake systems, such as for brake systems of automotive vehicles, is provided with two interconnected brake fluid chambers which are in communication each other over one port for connection to each one pressure chamber of a tandem master cylinder. To enable manufacture of a like compensating reservoir by one single injection molding process, there is provided a tube which extends transversely to the reservoir's vertical axis and which projects from one of the brake fluid chambers, the said projecting end being adapted to be closed.

6 Claims, 6 Drawing Figures

PLASTIC COMPENSATING RESERVOIR FOR HYDRAULIC BRAKE SYSTEMS

BACKGROUND OF THE INVENTION

The present invention relates to a plastic compensating reservoir for hydraulic brake systems, such as brake systems of automotive vehicles. The reservoir has two interconnected brake fluid chambers, each of which is in communication with a port to connect each fluid chamber to a pressure chamber of a tandem master brake cylinder.

A generally similar compensating reservoir is known from British patent specification No. 1,548,669. The reservoir of this patent comprises two brake fluid chambers arranged at a distance side by side and interconnected by an intermediate chamber disposed between them. The intermediate chamber contains a float of a fluid level indicator. Each of the brake fluid chambers at its top is closed by a separate cap and each has at its bottom a port, with both ports extending in parallel to the vertical axis of the reservoir. Due to its complicated design, the reservoir shown by the patent is very expensive to manufacture, since it cannot be made by injection molding. Further, this reservoir requires a relatively large mounting space.

Admittedly, there are other known plastic compensating reservoirs which can be manufactured by injection molding. These moldable compensating reservoirs, however, are likewise relatively complicated in their design and contain several undercuts. For such reservoirs, the lower part and the upper part must be injectionmolded separately during manufacture and welded together subsequently. Consequently, this procedure requires considerable time and expense, since a casting machine will be occupied twice followed by a welding process afterwards.

SUMMARY OF THE INVENTION

It is therefore an object of the present invention to provide a plastic compensating reservoir for use as the reservoir of a vehicular hydraulic brake system, the reservoir having been designed to be manufactured in one single injection molding process.

In the reservoir of the present invention, there is a tube which extends transversely to the reservoir's vertical axis and which projects out of one of the brake fluid chambers, the projecting end being adapted to be closed. Thus, a plastic compensating reservoir is produced which is of very straightforward design and can be manufactured by a casting machine in one single injection molding process. In this arrangement, the removal of the mold core is effected through the tube that extends transversely to the reservoir's vertical axis. If desired, the tube can be used, for example, a clutch hose can be connected to the tube, if desired. Closing of the tube can be accomplished simply by squeezing and welding it.

According to an advantageous embodiment of this invention, a connecting tube which extends transversely to the reservoir's vertical axis is provided for interconnection between the brake fluid chambers, the tube being disposed on the same axis as the projecting tube. With this design, the removal of the core from the mold can be performed simply by a single operation. According to another embodiment of the invention, the tube which extends transversely to the reservoir vertical axis may comprise the master cylinder port of the corresponding chamber.

A particularly economical arrangement of the invention includes a central float chamber connected to the brake fluid chambers, so that the compensating reservoir comprises the three chambers. The reservoir has a substantially cylindrical shape and that the brake fluid chambers are configured by at least one radial partition wall arranged in the compensating reservoir. Suitably, the float chamber is also of substantially cylindrical design and is located concentrically in the reservoir. This construction ensures an extremely economical positioning of the float in that area of the compensating reservoir in which there occurs the least level variations in the event of inclination, acceleration or slowing down of the vehicle.

In another embodiment of the present invention, the float chamber contains at its periphery two bulged-out portions, elongated in cross-section, each of which projects into a brake fluid chamber and each has openings connecting the respective brake fluid chamber to the float chamber.

To delay the occurrence of fluid level variations in the event of inclination, acceleration or slowing down of the vehicle, it is preferable that a brake fluid chamber having one port be provided with a wall which starts from the wall of the float chamber. The wall partially encloses the bore arranged in the bottom of the chamber and extends substantially vertically to the bottom.

To achieve stabilization of the tube which projects out of the reservoir, there is provided a reinforcing element coupling the tube to the reservoir outer wall.

In one preferred embodiment, the two brake fluid chambers may be closed by one joint cap which will be screw-threaded for this purpose.

BRIEF DESCRIPTION OF THE DRAWINGS

The embodiments of the present invention are explained in detail in the following description viewed in accordance with the accompanying drawings, in which.

DETAILED DESCRIPTION

Figure 1:
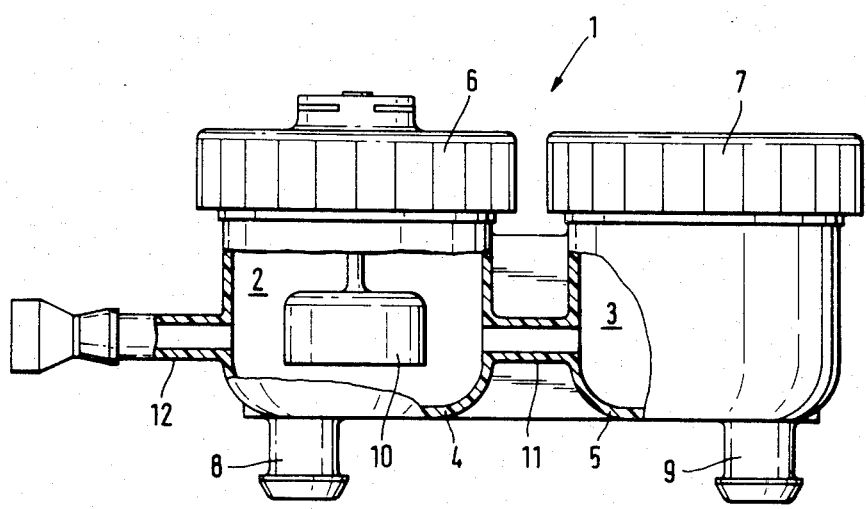
FIG. 1 is a side view in elevation of a plastic compensating reservoir having brake fluid chambers arranged side by side and partially broken away to show the interior thereof.
Figure 2:
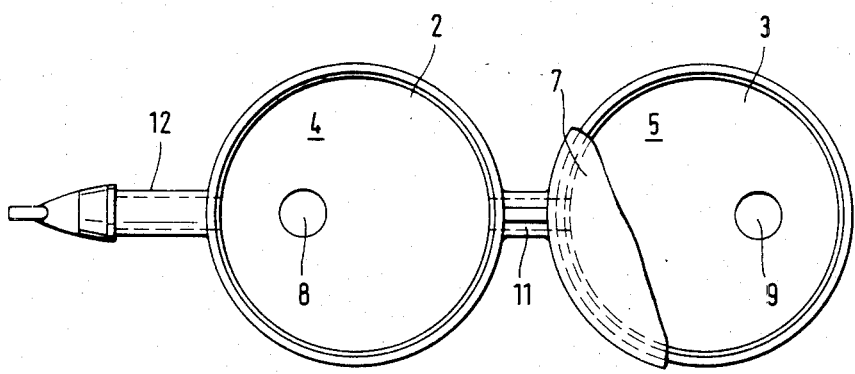
FIG. 2 is a top view of the plastic compensating reservoir of FIG. 1 with the right chamber partially broken away and the left chamber uncovered.

FIGS. 1 and 2 illustrate a compensating reservoir 1 comprised of two brake fluid chambers 2, 3 arranged side by side. Each brake fluid chamber is of substantially cylindrical design on generally vertical, parallel axes. The lower end of the chambers are closed by respective bottom walls 4 and 5, while on the top end they have threaded caps 6 and 7, respectively. At the bottom walls 4 and 5 of each brake fluid chamber 2 and 3, there is provided a port 8 and 9, respectively which extends in parallel with the reservoir's vertical axis and spaced therefrom. These ports are respectively connected to corresponding ports of a tandem master brake cylinder (not shown). The brake fluid chamber 2 contains inside a float 10 of a brake fluid level gauge.

The brake fluid chambers 2 and 3 are interconnected via a connecting tube 11 which extends transversely to the reservoir's vertical axis to ensure level compensation. A tube 12 projects radially out of the brake fluid chamber 2, the axes of the connecting tube 11 and of the tube 12 being disposed linearly. In this arrangement, the core (not shown) forming the connecting tube 11 can be drawn out easily through the tube 12 when the reservoir is manufactured by injection molding. After the removal of the core, the projecting end of the tube 12 will be closed, such as by welding. In case of need, the end can be cut open, for instance, for the purpose of connecting a clutch hose.

Figure 3:
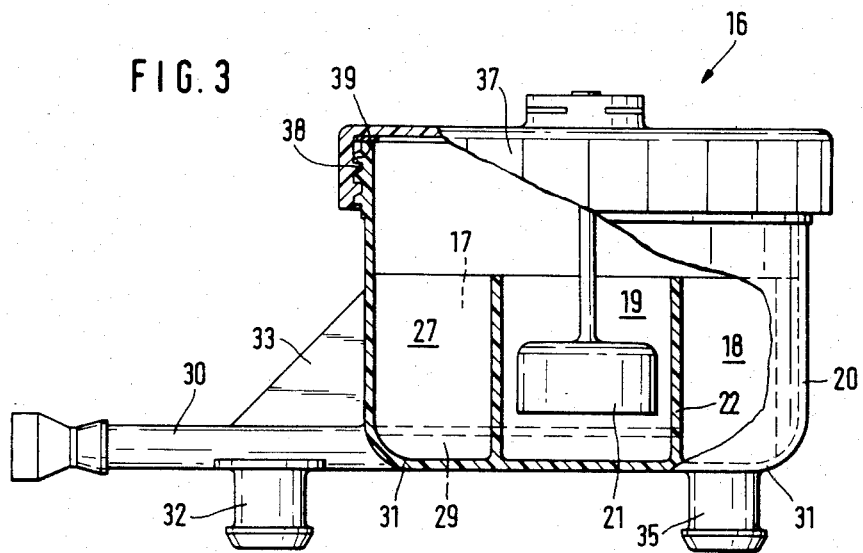
FIG. 3 is a side view in elevation partially broken away to show a second embodiment of the invention in which a compensating reservoir has a float chamber, and in which the reservoir comprising the brake fluid chamber and the float chamber is of substantially cylindrical shape.
Figure 4:
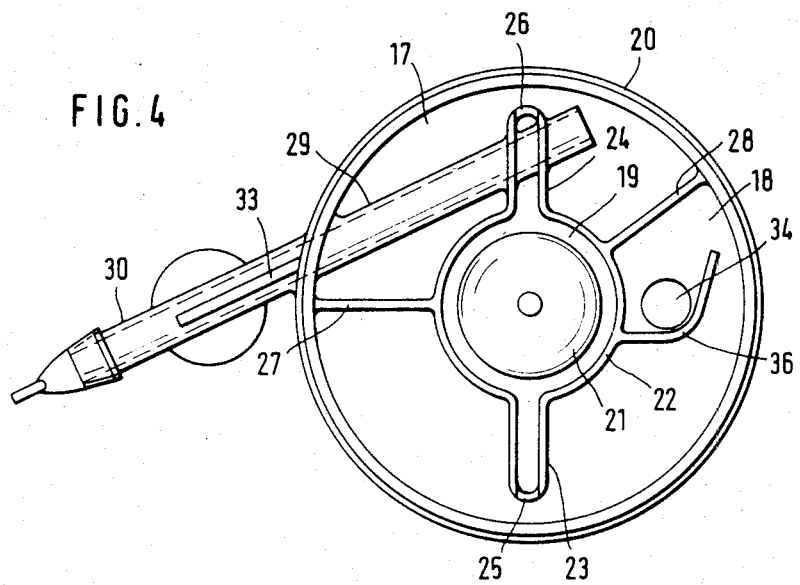
FIG. 4 is a top view of the compensating reservoir of FIG. 3.

The second embodiment of compensating reservoir 16 illustrated in FIGS. 3 and 4 is of substantially cylindrical shape, with internal brake fluid chambers 17 and 18 and a float chamber 19 being formed within the compensating reservoir 16 by the use of internal walls. The float chamber 19 is likewise of substantially cylindrical shape and is arranged concentrically relative to the reservoir's outer wall 20. The float chamber 19 includes a float 21 within the chamber. The substantially circular cylindrical wall 22 of the float chamber has two bulged-out portions 23 and 24, both elongated in cross section, each of which projects into one of the brake fluid chambers 17 and 18 and each of which is provided at its ends with openings 25 and 26, respectively which connect the brake fluid chambers 17 and 18 with the float chamber 19. By virtue of the bulged-out portions 23, 24, labyrinthine passages will be formed in the interior of the reservoir to delay level variations in the event of inclination, deceleration and acceleration of the vehicle.

The brake fluid chambers 17 and 18 are formed by walls 27 and 28 which extend from the wall 22 of the central float chamber 19 radially outwardly to the reservoir's outer wall 20.

Projecting into brake fluid chamber 17 is a tube 29 whose end 30 extends through the reservoir's outer wall 20 out of the compensating reservoir 16. Tube 29 extends transversely to the reservoir vertical axis and is arranged on the bottom wall 31 of the reservoir in a tangentially radially extending fashion as shown in FIG. 4. The projecting end 30 of the tube 29 comprises a port 32 extending in parallel to the reservoir's vertical axis and is preferably closed at its end. This closing can be effected the same way as described relative to the embodiment of FIGS. 1 and 2. To strengthen the tube mounting, a reinforcing web element 33 extends between the reservoir's outer wall 20 and the outer portion of the tube 29. The brake fluid chamber 18 contains in its bottom wall 31 an opening 34 for a second port 35 parallel to the reservoir axis. The opening 34 is within the brake fluid chamber 18 encompassed by a wall 36 which, starting from the wall 22 of the float chamber 19, encloses the opening partially and which extends substantially perpendicular to the bottom 31. This wall 36 forms another labyrinthine passage for the flow of brake fluid.

On top, the compensating reservoir 16 is closed by means of a single threaded cap 37 covering all three chambers 17, 18 and 19. The threaded cap 37 comprises an internal thread 38 which can be screwed to an external thread 39 which is provided at the upper edge of the reservoir's outer wall 20.

Figure 5:
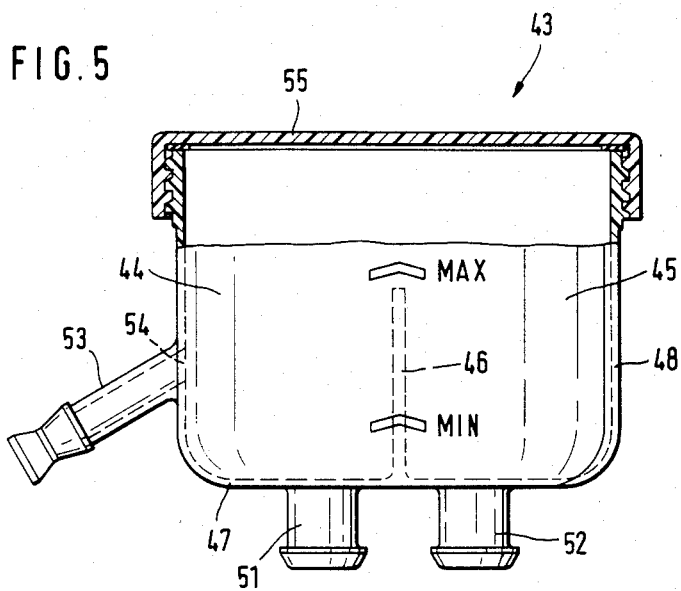
FIG. 5 is a side view in elevation partially broken away to show a cross section through the axis of a further embodiment of a cylindrical reservoir containing two brake fluid chambers.
Figure 6:
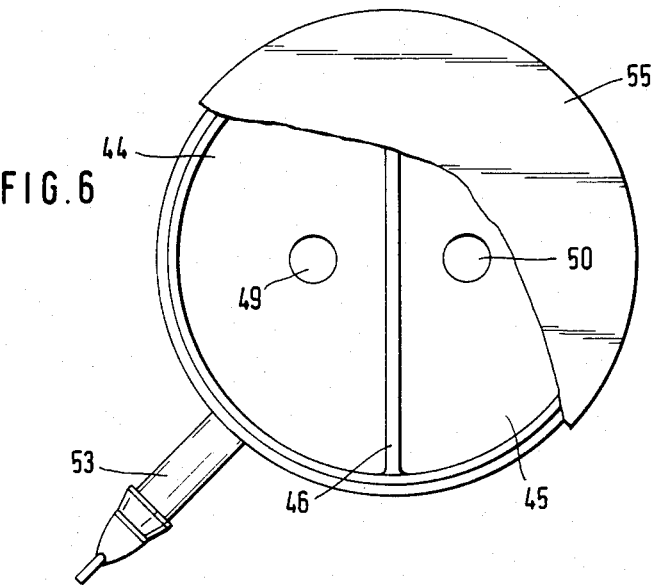
FIG. 6 is a top view of the compensating reservoir of FIG. 5 in partial cross section.

The compensating reservoir 43 illustrated in FIGS. 5 and 6 is in its outward appearance similar to the compensating reservoir 16. Like the latter, it is of substantially cylindrical design and contains two brake fluid chambers 44, 45. These brake fluid chambers 44, 45 are constituted by a diametrically extending wall 46 which extends from the bottom wall 47 of the reservoir toward the top, however, not as far as the reservoir's outer wall 48. In the bottom 47, there are provided openings 49, 50 with respective ports 51, 52 in each chamber. A radially extending tube 53 is arranged at the reservoir's outer wall 48 at an acute angle in relation to the reservoir's vertical axis and terminates through an opening 54 in the reservoir's outer wall 48 in the brake fluid chamber 44. The end of the tube 53 is closed, as for instance, in FIGS. 1 through 4, and can be opened for the purpose of connecting a clutch hose. The compensating reservoir 43 of this embodiment is closed by means of a threaded cap 55.

What is claimed is:

1. A plastic compensating reservoir for hydraulic brake systems, such as for brake systems of automotive vehicles, said reservoir including two interconnected brake fluid storage chambers each of which is in communication with a respective port adapted to be connected to a pressure chamber of a tandem master brake cylinder, the invention in which said reservoir comprises a generally cylindrical housing containing said chambers in an annular band, and in which there is a float chamber within said reservoir concentric to the axis of the housing inside of said band with a generally cylindrical wall of lesser height than the housing height defining said float chamber, radial walls extending from the float chamber wall to combinedly form with said float chamber wall said storage chambers, a port extending from each storage chamber, passages from said float chamber extending to the respective storage chambers to place that chamber and said storage chambers in communication, a downwardly projecting outlet port extending from each storage chamber to the exterior thereof, a generally horizontal tube extending generally transverse to the axis of the housing adjacent the bottom of said housing, the tube having an opening within the reservoir in one storage chamber, and the outlet port from said one storage chamber projecting from said tube.

2. A plastic compensating reservoir as claimed in claim 1, in which said float chamber wall has diametrically opposed bulged sections therein, and in which said passages comprise openings in said bulged sections between said float chamber and both said storage chambers for communication therebetween.

3. A plastic compensating reservoir as claimed in claim 1, in which the float chamber has at its periphery two bulged-out sections, elongated in cross section, which project each into a storage chamber and contain openings connecting the storage chambers to the float chamber.

4. A plastic compensating reservoir as claimed in claim 1, in which the tube extends tangentically radially from the housing and is provided with a reinforcing element which interconnects the reservoir housing and the tube projecting from the reservoir.

5. A plastic compensating reservoir as claimed in claim 1, in which both storage chambers and said float chamber are closed by a single common cap.

6. A plastic compensating reservoir as claimed in claim 5, in which the common cap comprises a screw thread mating with a threaded generally cylindrical top opening of said reservoir housing.

* * * * *